US011740326B2

(12) United States Patent
Chritton

(10) Patent No.: US 11,740,326 B2
(45) Date of Patent: Aug. 29, 2023

(54) SIMULATION SYSTEM FOR TESTING A RADAR SYSTEM

(71) Applicant: HONEYWELL FEDERAL MANUFACTURING & TECHNOLOGIES, LLC, Kansas Citiy, MO (US)

(72) Inventor: Audrey L. Chritton, Kansas City, MO (US)

(73) Assignee: HONEYWELL FEDERAL MANUFACTURING & TECHNOLOGIES, LLC, Kansas City, MO (US)

( * ) Notice: Subject to any disclaimer, the term of this patent is extended or adjusted under 35 U.S.C. 154(b) by 553 days.

(21) Appl. No.: 16/822,197

(22) Filed: Mar. 18, 2020

(65) Prior Publication Data

US 2021/0293924 A1 Sep. 23, 2021

(51) Int. Cl.
*G01S 7/40* (2006.01)
(52) U.S. Cl.
CPC .......... *G01S 7/4052* (2013.01); *G01S 7/4021* (2013.01); *G01S 7/4095* (2021.05)
(58) Field of Classification Search
CPC ..... G01S 7/4052; G01S 7/4021; G01S 7/4095
See application file for complete search history.

(56) References Cited

U.S. PATENT DOCUMENTS

| | | | | |
|---|---|---|---|---|
| 3,167,768 A | * | 1/1965 | Rosen | G01S 7/4021 342/170 |
| 4,982,196 A | * | 1/1991 | Thomas | G01S 7/4052 342/172 |
| 5,223,840 A | | 6/1993 | Cronyn | |
| 5,457,463 A | * | 10/1995 | Vencel | G09B 9/54 342/170 |
| 5,518,400 A | * | 5/1996 | Otoide | G01S 7/4052 434/4 |
| 6,067,041 A | * | 5/2000 | Kaiser | G01S 7/4052 342/171 |

(Continued)

OTHER PUBLICATIONS

Brooker, Marc, "The Design and Implementation of a Simulator for Multistatic Radar Systems" University of Cape Town. Jun. 2008.
Sward, William S. et al., "Phase Continuous Radar Test Set" IEEE Xplore. Sep. 13, 2010.
Välimäki, Vesa, "A New Filter Implementation Strategy for Lagrange Interpolation" IEEE Xplore. Apr. 30, 1995.

(Continued)

*Primary Examiner* — Marcus E Windrich
(74) *Attorney, Agent, or Firm* — HOVEY WILLIAMS LLP

(57) ABSTRACT

A simulation system for use in testing a radar system comprises a coarse delay module, a fine delay module, and a doppler shift module. The coarse delay module is configured to receive a first stream of digital data samples that are sampled from a radar signal at a sample time period or a second stream of digital data samples that are processed by another simulation system component and delay the digital data samples by a selectable first delay time that is greater than or equal to the sample time period. The fine delay module is configured to receive the digital data samples and filter the digital data samples to represent delay by a selectable second delay time that is less than the sample time period. The doppler shift module is configured to receive the digital data samples and adjust a value of a frequency content of the fine delayed samples.

17 Claims, 4 Drawing Sheets

(56) References Cited

U.S. PATENT DOCUMENTS

| | | | | |
|---|---|---|---|---|
| 6,301,552 | B1* | 10/2001 | Gomez | G01S 7/4052 |
| | | | | 703/2 |
| 6,384,771 | B1* | 5/2002 | Montague | G01S 7/4052 |
| | | | | 342/170 |
| 7,327,308 | B2* | 2/2008 | Cheng | G01S 7/4056 |
| | | | | 342/178 |
| 8,060,226 | B2* | 11/2011 | Saveli | H03H 17/0009 |
| | | | | 381/61 |
| 8,781,049 | B1* | 7/2014 | Belitzer | H04L 7/0337 |
| | | | | 375/295 |
| 9,106,402 | B2* | 8/2015 | Belitzer | H04L 7/0079 |
| 10,852,394 | B2* | 12/2020 | Salvesen | G01S 7/285 |
| 11,201,604 | B1* | 12/2021 | Liu | H03H 17/0642 |
| 2017/0146643 | A1* | 5/2017 | Nestler | G01S 7/52047 |
| 2020/0110156 | A1* | 4/2020 | Ahmed | G01S 7/4095 |
| 2021/0293952 | A1* | 9/2021 | Haque | G10K 11/343 |
| 2022/0094403 | A1* | 3/2022 | Forenza | H04B 7/0456 |

OTHER PUBLICATIONS

Laakso, Timo et al., "Splitting the Unit Delay" IEEE Signal Processing Magazine. Jan. 1996.

Zhang, Xinggan et al., "An Improved Cross-Correlation Method Based on Fractional Delay Estimation for Velocity Measurement of High Speed Targets" Proceedings of the World Congress on Engineering and Computer Science 2013 vol. II. Oct. 23, 2013.

Meena, D. et al., "Design of Multilevel Radar Target Simulator" IEEE Xplore. Apr. 17, 2007.

Rajitha, K. et al., "Digital RF Memory Based Target Simulator for Radar" International Journal of Emerging Technology and Advanced Engineering: vol. 4, Issue 9. Sep. 2014.

Peng, Zhang, "Realization of radar target simulator based on general instruments" IEEE Xplore. Oct. 14, 2015.

Parthasarathy, B., "Target simulator to calibrate wideband radar in measuring the internal layers of the Greenland ice sheet" IEEE Xplore. May 4, 2004.

* cited by examiner

SIMULATION SYSTEM FOR TESTING A RADAR SYSTEM

STATEMENT REGARDING FEDERALLY-SPONSORED RESEARCH OR DEVELOPMENT

This invention was made with Government support under Contract No.: DE-NA00002839 awarded by the United States Department of Energy/National Nuclear Security Administration. The Government has certain rights in the invention.

FIELD OF THE INVENTION

Embodiments of the current invention relate to systems that simulate targets to test radar systems.

DESCRIPTION OF THE RELATED ART

Radio detection and ranging (radar) systems transmit radio frequency wireless signals, also known as radio waves, into a region or space and receive reflections of the radio waves. The radio waves are transmitted and received by one or more antennas. The reflections are created by the radio waves bouncing off, or reflecting from, objects (also known as "targets") in the path of the radio waves. The objects may include aircraft, ships, spacecraft, guided missiles, motor vehicles, weather formations, terrain, and the like. The characteristics of the reflections, such as time delay between transmission and reception, frequency shift of the radio waves, angle of arrival, and so forth, are analyzed by the radar system to determine a range from the radar source, an angle or bearing from the source, and/or a velocity of the objects. To verify the operation of a radar system, it needs to be tested. A straightforward approach to testing may involve placing objects at known distances or locations from the radar source and operating the radar system to verify that it detects the objects in the correct location. However, to fully test the radar system, different types of objects, such as aircraft, vehicles, etc., would need to be used. The objects would need to be placed at a variety of distances and angles from the radar source. Furthermore, some objects would need to be stationary, while others should be moving. Thorough testing of the radar system with this approach would be time consuming and costly.

SUMMARY OF THE INVENTION

Embodiments of the current invention solve the above-mentioned problems and provide a simulation system to simulate objects, or targets, for testing a radar system. Instead of receiving the radio waves from the radar system and reflecting them back to simulate objects at various locations, the simulation system receives from the radar system a first electronic signal that would normally be provided to one or more antennas that transmit the radio waves. The simulation system also provides to the radar system a second electronic signal that would normally be generated by one or more antennas as a result of receiving reflections. The simulation system includes components, described in more detail below, that can delay the electronic signal from the radar system in order to simulate objects at a variety of ranges, objects that are stationary, wobbling, scintillating, or moving, and objects that are moving toward or away from the radar source. Since the simulation system does not involve physical objects, it can test the radar system quickly and cost effectively, and provide a repeatable, deterministic, and high quality simulation.

An exemplary simulation system broadly comprises a coarse delay module, a fine delay module, and a doppler shift module. The coarse delay module is configured to receive either a first stream of digital data samples that are sampled from a radar signal at a sample time period or a second stream of digital data samples that are processed by another simulation system component, delay the digital data samples by a selectable first delay time that is greater than or equal to the sample time period, and output coarse delayed samples. The fine delay module is configured to receive either the first stream of digital data samples or the second stream of digital data samples, filter the digital data samples to represent delay by a selectable second delay time that is less than the sample time period, and output fine delayed samples. The doppler shift module is configured to receive either the first stream of digital data samples or the second stream of digital data samples, adjust a value of one or more frequency components of the digital data samples, and output doppler shifted samples.

Another embodiment of the current invention provides a simulation system for use in testing a radar system comprising a coarse delay module, a fine delay module, and a doppler shift module. The coarse delay module is configured to receive either a first stream of digital data samples that are sampled from a radar signal at a sample time period or a second stream of digital data samples that are processed by another simulation system component, delay the digital data samples by a selectable first delay time that is greater than or equal to the sample time period, and output coarse delayed samples. The coarse delay module includes a memory element and a memory controller. The memory element is configured to receive the digital data samples and store them, with each digital data sample being stored in a different one of a plurality of memory locations. The memory element is further configured to transmit the digital data samples.

The fine delay module is configured to receive either the first stream of digital data samples or the second stream of digital data samples, filter the digital data samples to represent delay by a selectable second delay time that is less than the sample time period, and output fine delayed samples. The fine delay module includes a fractional delay filter and a fractional delay controller. The fractional delay filter includes a plurality of computational stages configured to perform an interpolation calculation to determine values of the digital data samples at the second delay time. The fractional delay controller is configured to control the operation of the fractional delay filter by setting parameters of the computational stages.

The doppler shift module is configured to receive either the first stream of digital data samples or the second stream of digital data samples, adjust a value of one or more frequency components of the digital data samples, and output doppler shifted samples.

Yet another embodiment of the current invention provides a simulation system for use in testing a radar system comprising a doppler shift module, a fine delay module, and a coarse delay module. The fine delay module is configured to receive either a first stream of digital data samples that are sampled from a radar signal at a sample time period or a second stream of digital data samples that are processed by another simulation system component. The fine delay module includes a variable time delay unit and a fractional delay filter. The variable time delay unit is configured to receive the digital data samples, delay them by a variable time period, and output variable time delayed samples. The fractional delay filter is configured to receive the variable time delayed samples, filter the variable time delayed samples to represent delay by a selectable first delay time that is less than the sample time period, and output fine delayed samples. The doppler shift module is configured to receive either the first stream of digital data samples or the second stream of digital data samples, adjust a value of one or more frequency components of the digital data samples, and output doppler shifted samples. The coarse delay module configured to receive either the first stream of digital data samples or the second stream of digital data samples, delay the digital data samples by a selectable second delay time that is greater than or equal to the sample time period, and output coarse delayed samples.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
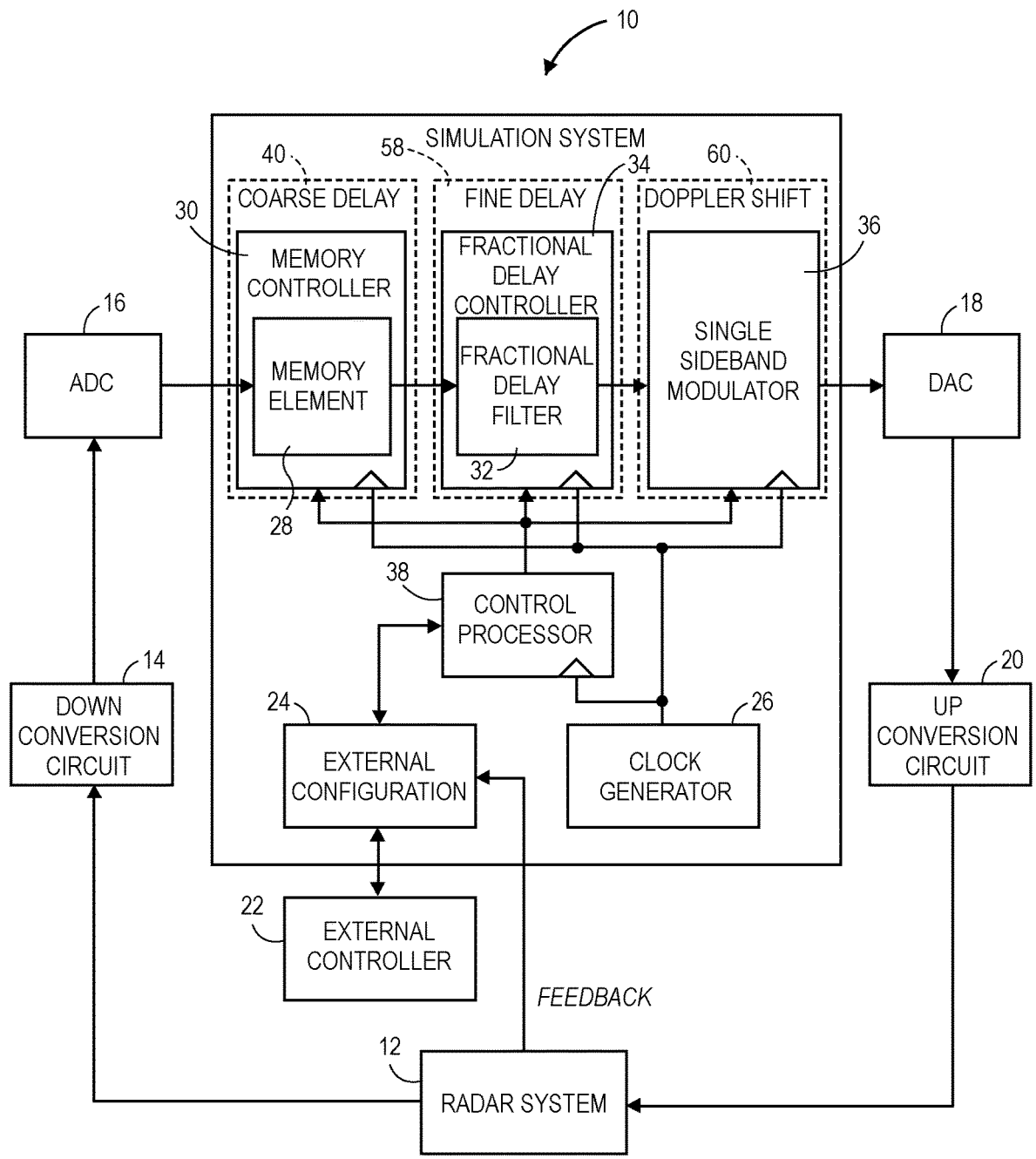
FIG. 1 is a schematic block diagram of a simulation system, constructed in accordance with various embodiments of the current invention, for testing a radar system.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

A simulation system 10, constructed in accordance with various embodiments of the current invention, for simulating targets, or objects of interest, while testing a radar system 12 is shown in FIG. 1. The simulation system 10 may interface or communicate with intermediate electronic circuitry including a down conversion circuit 14, an analog to digital converter 16, a digital to analog converter 18, an up conversion circuit 20, and an external controller 22.

The radar system 12 is a radio and ranging (RADAR) system that may be utilized to observe, identify, or track targets or objects of interest which are moving or stationary. The radar system 12 normally outputs radio frequency (RF) signals that are transmitted wirelessly via one or multiple antennas (not shown in FIG. 1) and known as radar beams. The radar system 12 also receives reflections of the beams that have bounced off or reflected from objects within the path of the radar beams, i.e., the targets. The radar system 12 processes the received reflected radar beams in order to determine the positions and velocities of the targets. However, to simplify the setup for testing the radar system 12, the radar system 12 may be configured without its antennas as shown in FIG. 1. In this configuration, the radar system 12 outputs RF electronic signals that are not ever transmitted wirelessly. The radar system 12 also receives RF electronic signals, such as a radar input signal, which represents reflections of the radar beams.

The down conversion circuit 14 generally receives an electronic signal that includes one or more frequency components and converts all frequency components of the electronic signal from a higher frequency value to a lower frequency value. The down conversion circuit 14 may include, or be formed from, electronic components and circuits, such as tunable oscillators, mixers, filters, detectors, amplifiers, and the like. The down conversion circuit 14 receives the radar output signal from the radar system 12 and converts the radar output signal from a higher frequency value to a lower frequency value. The down conversion circuit 14 outputs a down-converted signal which includes the lower frequency component value.

The analog to digital converter (ADC) 16 generally converts an analog electronic signal to a sequence of sampled digital values. The ADC 16 may utilize, or implement, any one of a plurality of conversion architectures, such as direct conversion, successive approximation, ramp compare, Wilkinson, integrating, etc. The ADC 16 receives the down-converted signal from the down conversion circuit 14, samples it at a sample frequency or rate whose inverse is a sample period, and outputs a stream of digital samples, with each sample having a value equal to, or corresponding to, a value of the electric voltage, or other electrical characteristic, of the down-converted signal when it was sampled.

The digital to analog converter (DAC) 18 generally converts a stream of digital values into an analog electronic signal whose waveform or shape is determined by the digital values. The DAC 18 may utilize, or implement, any one of a plurality of conversion architectures, such as pulse-width modulation, oversampling, interpolating, delta-sigma, binary weighted, R-2R ladder, etc. The DAC 18 receives a simulation signal from the simulation system 10 and converts it to an analog intermediate frequency signal.

The up conversion circuit 20 generally receives an electronic signal that includes one or more frequency components and converts all frequency components of the electronic signal from a lower frequency value to a higher frequency value. The up conversion circuit 20 may include, or be formed from, electronic components and circuits, such as tunable oscillators, mixers, filters, detectors, amplifiers, and the like. The up conversion circuit 20 receives the intermediate frequency signal from the DAC 18 and converts the intermediate frequency signal from a lower frequency value to a higher frequency value. The up conversion circuit 20 outputs an up-converted signal which includes the higher frequency component value.

The external controller 22 generally controls the overall operation of the simulation system 10 and monitors its performance. The external controller 22 may be embodied by an embedded microcontroller or a computer, such as a workstation computer, a desktop computer, a laptop computer, a tablet computer, and so forth. Utilizing a software program, the external controller 22 may automate testing or schedule one or more tests for the simulation system 10 to execute. Accordingly, the external controller 22 may determine, or establish, the configuration or parameters for each test. The parameters may include a number of targets to simulate, whether each target is stationary or moving, a velocity of a moving target, and the like. Furthermore, based on feedback from the radar system 12, the external controller 22 may adjust the parameters of the tests or may schedule additional tests. In addition, the results of each test may be stored in, and evaluated by, the external controller 22.

The simulation system 10 may broadly comprise an external configuration block 24, a clock generator 26, a memory element 28, a memory controller 30, a fractional delay filter 32, a fractional delay controller 34, a single sideband modulator 36, and a control processor 38. The simulation system 10 may be implemented in a field programmable gate array (FPGA) or an application specific integrated circuit (ASIC), and thus the functions of the simulation system 10 may be executed in hardware, software, firmware, or combinations thereof. Portions of the simulation system 10 may be formed by the execution of code from a hardware description language. Furthermore, the simulation system 10 may include memory or data storage that constitutes or embodies a non-transitory "computer-readable medium" capable of storing functional instructions, code, code statements, code segments, software, firmware, programs, applications, apps, services, daemons, or the like.

The external configuration block 24 generally acts as an interface between the control processor 38, or the simulation system 10 in general, and the external controller 22. The external configuration block 24 may include electronic circuitry and/or software programming to perform logic processing and decision making. The external configuration block 24 may send and receive commands, control signals, and/or data from the external controller 22. The external configuration block 24 may also send and receive commands, control signals, and/or data from the control processor 38. In addition, the external configuration block 24 may receive feedback in the form of commands, control signals, and/or data from the radar system 12, typically during testing. The external configuration block 24 may forward the feedback to both the external controller 22 and the control processor 38.

The clock generator 26 generates a clock or timing signal to provide synchronous operation of the simulation system 10. The clock generator 26 may include crystals, oscillators, square-wave generators, or the like, or combinations thereof. The clock signal is periodic, typically a square wave, and is generated with a clock frequency, whose inverse is a clock period or clock cycle. The clock signal is communicated to and received by the other components of the simulation system 10.

The memory element 28 stores the digital samples of the radar output electronic signal from the ADC 16, referred to hereinafter as "digital samples", and may be embodied by devices or components that store data in general, and digital or binary data in particular, and may include exemplary electronic hardware data storage devices or components such as random-access memory (RAM), i.e., static RAM (SRAM) or dynamic RAM (DRAM), or the like. The storage devices typically include a plurality of storage locations (or addresses), wherein each storage location is capable of storing a multibit data word (such as a digital sample of the radar output signal). The memory element 28 may also be formed from a sequence of storage registers, such as shift registers, first-in, first-out (FIFO) structures, etc. The memory element 28 may further include at least one write memory pointer which stores the current location or register in which digital samples have been written or stored. The memory element 28 may also include at least one read memory pointer which stores the current location or register in which digital samples have been read. The memory element 28 receives the stream of digital samples from the ADC 16. The samples are stored in, or written to, the storage locations or registers, as determined by the write memory pointer, which are typically successive locations within the memory element 28. After a period of time determined by, or varying according to, the parameters of the test that is being run, the digital samples are read from, or shifted out of, the storage locations or registers, as determined by the read memory pointer.

The memory controller 30 generally controls the flow of data samples into and out of the memory element 28. The memory controller 30 may be formed from controller and/or processor electronic circuitry, such as a finite state machine (FSM), or the like, and may include additional logic circuitry. Alternatively, the memory controller 30 may be implemented as a software program or application. Based on commands, control signals, and/or data from the control processor 38, the memory controller 30 may set the values of the write and read memory pointers of the memory element 28 to control which storage locations or registers have samples written to them and which storage locations or registers have samples read from them. Thus, for each data sample, the memory controller 30 stores the sample in a memory location, waits for an amount of time, and then has the sample read from the memory location and communicated to the next component. By controlling the amount of time that each data sample is stored in a memory location, the memory controller 30 is controlling the amount of delay time that the memory element 28 introduces to the digital samples.

The memory element 28 and the memory controller 30 may form a coarse delay module 40 which provides lower resolution control of the delay of the digital samples. That is, the coarse delay module 40 may delay the data samples by relatively larger delay times, or times that are greater than or equal to the sample time period, which is "coarse delay".

The fractional delay filter 32 generally provides the ability to filter the digital samples to simulate or approximate delaying the digital samples by a fractional amount of the sample time period, which may also be known as the "unit delay". This is akin to resampling the down-converted signal at an offset from the time periods at which the digital samples are created. For example, if the digital samples are provided at a rate of 1 gigahertz (GHz), or 1 giga samples per second, then the sample time period would be 1 nanosecond (ns). This sampling rate yields a first digital sample at a time of 1 ns, a second digital sample at a time of 2 ns, a third digital sample at a time of 3 ns, and so forth. Resampling at an offset would determine a value of the digital samples at times in between the known values, such as determining digital sample values at times of, for example, 1.5 ns, 2.5 ns, 3.5 ns, and so forth.

Since the fractional delay filter 32 cannot actually resample the down-converted signal to obtain digital sample values at fractional, offset amounts of the sample time period, i.e., fractional delay times, the fractional delay filter 32 performs an interpolation calculation to determine or approximate the digital sample values at fractional delay times. In various embodiments, the fractional delay filter 32 may perform a Lagrange interpolation on the digital sample values to determine or approximate their values at fractional delay times.

Figure 2:
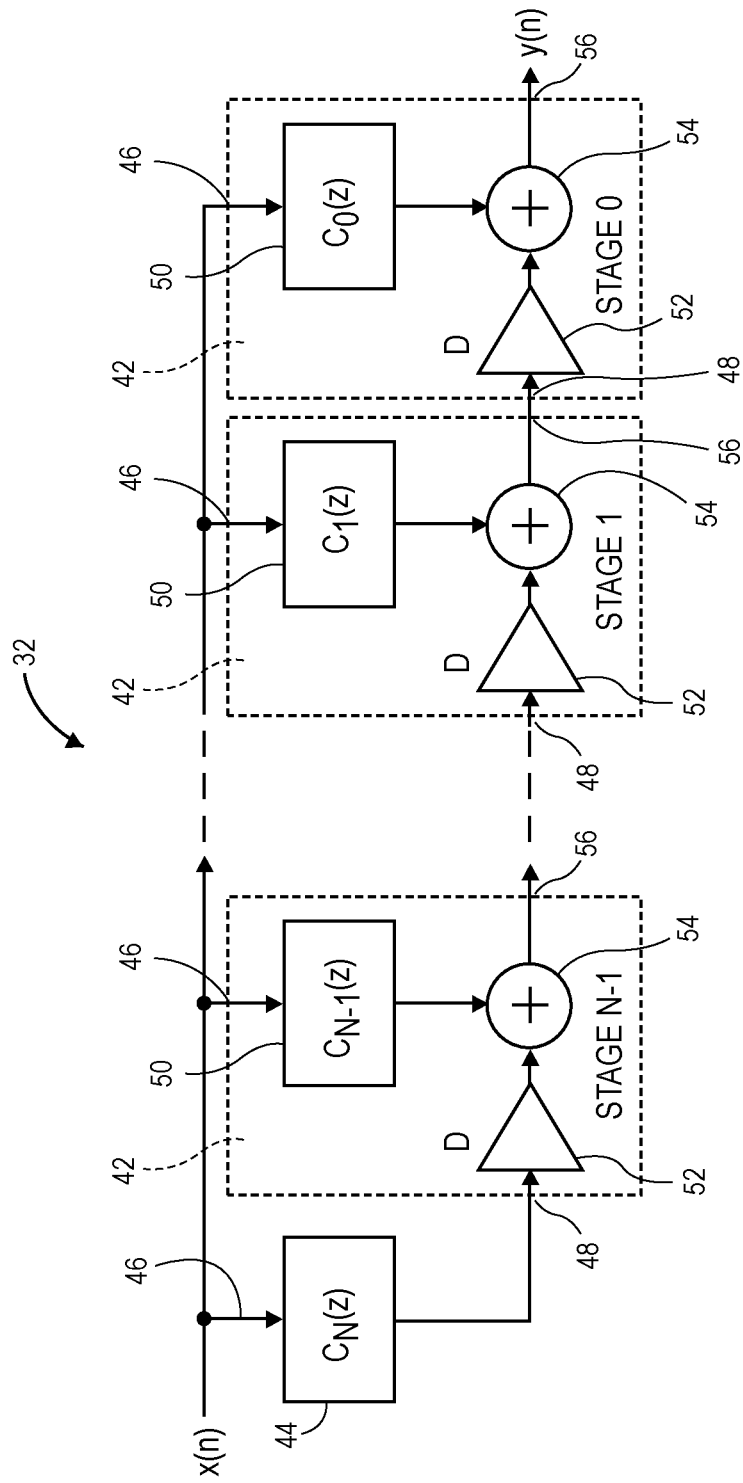
FIG. 2 is a schematic block diagram of a fractional delay filter of the simulation system.

An exemplary fractional delay filter 32 includes a Farrow structured fractional delay filter as shown in FIG. 2 and described in more detail in U.S. patent application Ser. No. 16/985,884, entitled "FRACTIONAL DELAY FILTER FOR A DIGITAL SIGNAL PROCESSING SYSTEM", and filed Aug. 5, 2020, which is hereby incorporated by reference in its entirety into the current patent application. The fractional delay filter 32 includes a plurality of stages of computational blocks 42 and a standalone filter block 44. Each computational block 42 includes a first input 46, a second input 48, a filter block 50, a coefficient block 52, an adder 54, and an output 56. The fractional delay filter 32 can include N stages of computational blocks 42 and one standalone filter block 44.

The first input 46 receives the digital sample from the memory element 28 at a rate of one digital sample per clock cycle. The second input 48 receives the output from an adjacent stage, which may be a successive stage, of computational block 42. The filter block 50, denoted as $C_n(z)$, with n having a value ranging from 0 to N−1, may be implemented as an Nth order finite impulse response (FIR) filter, wherein each FIR filter may have a plurality of filter stages, and each filter stage may require one or more coefficient values. The filter block 50 receives its input from the first input 46, and outputs a filtered sample. The coefficient block 52 performs a multiplication function wherein an input of the coefficient block 52 is multiplied by a coefficient with a selectable value of D. The input of the coefficient block 52 is the second input 48, and the output is a coefficient product. The adder 54 adds the coefficient product and the filtered sample and outputs the sum of the two, which is the output 56 of the computational block 42.

The standalone filter block 44, which is the same in structure and function as the other filter blocks 50, also receives the digital sample from the memory element 28 as its input. The output of the standalone filter block 44 is communicated to the second input 48 of the last stage (N−1) of the computational blocks 42.

Furthermore, the output 56 of the first stage (0) of the computational blocks 42 is the filtered digital sample output of the fractional delay filter 32.

A number of stages N, the filter block 50 (FIR) coefficients, and a value of D can be chosen and adjusted to meet various design constraints. In some situations, such as simulating a stationary target, the values of N, the filter block 50 coefficients, and D may be chosen to provide no fractional delay.

The fractional delay controller 34 generally controls the operation of the fractional delay filter 32. The fractional delay controller 34 may be formed from controller and/or processor electronic circuitry, such as an FSM, or the like, and may include additional logic circuitry. Alternatively, the fractional delay controller 34 may be implemented as a software or firmware program or application. Based on commands, control signals, and/or data from the control processor 38, the fractional delay controller 34 may set the number of stages N, the values of the coefficients for each filter block 50, and the value of the coefficient D.

The fractional delay filter 32 and the fractional delay controller 34 may form a fine delay module 58 which provides higher resolution control of the delay of the digital samples. That is, the fine delay module 58 may filter the digital samples to represent a delay by relatively smaller delay times, or times that are less than, or a fraction of, the sample time period, which is "fine delay".

The single sideband modulator 36 generally adjusts values of a frequency content of the digital samples and may form a Doppler shift module 60. The single sideband modulator 36 may be formed from electronic circuitry such as oscillators, mixers, filters, and the like, or combinations thereof. Alternatively, the single sideband modulator 36 may be implemented as a software or firmware program or application. The single sideband modulator 36 receives the digital samples from the fractional delay filter 32. The data of the digital samples may include a plurality of frequency components which makes up the frequency content of the digital samples. That is, $f_{digital\ samples} = [f_1, f_2, \ldots, f_n]$.

The single sideband modulator 36 may selectively or optionally adjust a value of one of more frequency components of the digital samples by either increasing the value or decreasing the value. The single sideband modulator 36 may receive commands, control signals, and/or data from the control processor 38 to adjust the frequency components and an amount to adjust. For example, the frequency components of the digital samples may have initial values when the digital samples enter the single sideband modulator 36. If the single sideband modulator 36 receives commands, control signals, and/or data to adjust the frequency content, then the single sideband modulator 36 may process the digital samples to have a shifted frequency value for each frequency component that is greater than or less than the initial frequency value by an amount delta $\Delta$. That is: $f_{1shifted} = f_{1initial} +/- \Delta$, $f_{2shifted} = f_{2initial} +/- \Delta$, . . . , $f_{nshifted} = f_{ninitial} +/- \Delta$. The single sideband modulator 36 may shift all of the frequency components, or it may shift a portion thereof. In situations where no Doppler shift is required, then the single sideband modulator 36 may simply pass through the digital samples with no modification.

FIG. 1 shows an exemplary flow that the digital samples follow from the ADC 16 to the coarse delay module 40, the fine delay module 58, and then to the Doppler shift module 60. In theory and in practice, the modules 40, 58, 60 could be arranged in any sequence and the simulation system 10 would still produce the same output.

The control processor 38 generally controls the operation of, and flow of digital samples through, the memory element 28, the fractional delay filter 32, and the single sideband modulator 36. The control processor 38 may be formed from controller and/or processor electronic circuitry, such as an FSM, or the like, and may include additional logic circuitry. Alternatively, the control processor 38 may be implemented as a software program or application. The control processor 38 may receive commands, control signals, and/or data from the external controller 22 regarding the parameters of the tests to run. The control processor 38 may then determine the control signals and values discussed hereinafter based on, or varying according to, the received parameters.

The control processor 38 may output a first command, control signal, and/or data to the memory controller 30 that determines the delay of the digital samples due to the coarse delay module 40. The first command, control signal, and/or data may provide the values of the write and read memory pointers which controls the spacing therebetween, and thus controls the timing of the flow of the digital samples through the memory element 28, which sets the value of the delay of the digital samples. In the case of a variable delay simulation, control processor 38 may change the spacing between the read and write pointers at a rate or frequency (not related to the frequency content of the digital samples), $f_{update}$, that can be constant or changing and thereby vary the amount of coarse delay applied to the digital samples by the coarse delay module 40. The rate or frequency that the spacing between memory pointers changes, $f_{update}$, may be determined and varied according to the velocity of the target that is being simulated. The maximum value of $f_{update}$ is the frequency at which data flows through the memory element 28, $f_{mem}$. That is $f_{update} \leq f_{mem}$.

The control processor 38 may determine configurations of the fractional delay filter 32 including the number of stages N, the values of the coefficients for each filter stage, and the value of the coefficient D. The control processor 38 may also determine a number of sampling interval divisions, $N_D$, based on, or varying according to, a value or amount of fractional delay time to be applied to the digital samples, wherein the time period of each sampling interval division is equal to a minimum value of the fractional delay time coefficient $D_{min}$. The coefficient D can be equal to $D_{min} \times N_D$, wherein $N_D = 1/D_{min}$. In operation, the control processor 38 may determine values for $D_{min}$ and $N_D$, and then vary the value of D during the simulation.

The control processor 38 may output a second command, control signal, and/or data to the fractional delay controller 34 that sets a value of $N_D$ and D. The control processor 38 may also update the value of D at a rate, or frequency, less than or equal to a product of the sampling interval division $N_D$ and the flow of digital samples through the memory element 28 $f_{mem}$. That is, $f_{update} \leq N_D \times f_{mem}$. If the test is to involve acceleration or deceleration of the simulated target, then the rate, or frequency, of updating the value of D may vary as a function of time. The control processor 38 may simulate non-uniform motion of the target by selecting the value of D from a statistical distribution about the nominal value of D that has been computed for either the constant velocity or non-zero acceleration calculations of D. In such a situation, $f_{update} = f_{mem}$.

The control processor 38 may output a third command, control signal, and/or data to the single sideband modulator 36 that sets or adjusts one or more values by which the frequency content of the digital samples is increased or decreased.

In addition, the control processor 38 may receive feedback from the digital system 12 (through the external configuration block 24). Based on the feedback, the control processor 38 may adjust the commands, control signals, and/or data communicated to the memory controller 30, the fractional delay controller 34, and the single sideband modulator 36 which control the operations of each of these components.

The simulation system 10 may operate as follows. The simulation system 10 generally provides a delay of the signal or data from the radar system 12, i.e., the digital samples, before the signal or data is returned to the radar system 12 in order to simulate one or more targets that are to be detected by the radar system 12. The delay of the signal or data, which is a period of time between the transmission of the signal or data from the radar system 12 and the reception of a simulated reflection of the signal or data by the radar system 12, determines a range, or distance, of the target from the radar system 12 source. Generally, a greater delay of the signal or data corresponds to a greater range of the target, while a smaller delay of the signal or data corresponds to a smaller range of the target. In addition, a constant delay of the signal or data may indicate a stationary target, while a variable delay of the signal or data may indicate a moving target. Furthermore, a change in a frequency component of the signal or data may indicate that the target is moving either toward the radar system 12 source or away from it—as would simulate the naturally-occurring Doppler shift of targets moving toward or away from a source.

The radar system 12 outputs the radar output signal, which is received by the down conversion circuit 14. The down conversion circuit 14 converts the frequency content of the radar output signal from its natural frequency value to a lower frequency value and outputs the down-converted signal. The ADC 16 samples the down-converted signal and generates a stream of digital samples.

The memory element 28 of the coarse delay module 40 receives the stream of digital samples from the ADC 16. The memory controller 30 determines the locations of the memory element 28 in which the digital samples will be temporarily stored. The memory controller 30 determines the locations of the memory element 28 from which the radar samples are read. The number of memory locations or samples between the write location and the read location corresponds to a selectable (determined by the parameters of the test) delay value.

The fractional delay filter 32 of the fine delay module 58 receives the digital samples as they are read from the memory element 28. The operation of the fractional delay filter 32 is determined by, and varies according to, the parameters of the type of target simulation to be performed. If a non-fluctuating, stationary target is to be simulated, then the number of stages N, the values of the coefficients for each filter stage, and the value of the coefficient D may be set by the fractional delay controller 34 to provide no fractional delay of the digital samples. If a fluctuating, or wobbling, stationary target is to be simulated, then a value of D that dithers around a nominal value may be chosen. If a moving target is to be simulated, then the number of stages N, the values of the coefficients for each filter stage, and the value of the coefficient D may be set by the fractional delay controller 34 to provide fractional delay of the digital samples in order to smooth the motion of the simulated target. The fractional delay may be constant or may be varied (different) for each digital sample. A fluctuating moving target, or one with non-uniform motion, may be simulated by dithering the value for the coefficient D around a nominal value. In addition, the fractional delay filter 32 may be set up by the fractional delay controller 34 to provide simulated micro-Doppler effects (compression of the reflected radar output signal pulse envelope due to target motion) on the digital samples. The fractional delay controller 34 in combination with the fractional delay filter 32 provide fine control of the delay of the digital samples—that is, filtering the data samples to represent delay times that are a fraction of the sample time period.

The single sideband modulator 36 of the Doppler shift module 60 receives the digital samples from the fractional delay filter 32. If no Doppler shift is necessary for the simulation, then the single sideband modulator 36 may output the digital samples without any modification. If a Doppler shift is needed for the simulation, then the control processor 38 may output the necessary commands, control signals, and/or data to instruct the single sideband modulator 36 to provide the appropriate change in the frequency content of the digital samples to simulate the Doppler shift. The single sideband modulator 36 outputs the digital samples that have been delayed and, optionally, frequency shifted.

The discussion above regarding the coarse delay module 40, the fine delay module 58, and the Doppler shift module 60 describes the exemplary flow of the digital samples in the sequential order of coarse delay module 40, fine delay module 58, and Doppler shift module 60, as shown in FIG. 1. It is within the scope of the current invention that the modules 40, 58, and 60 may be connected in any sequential order. For example, the Doppler shift module 60 may receive the digital samples from the ADC 16. The fine delay module 58 may receive the digital samples from the Doppler shift module 60. And the coarse delay module 40 may receive the digital samples from the fine delay module 58. Other sequential orders are possible as well. No matter the order of the modules 40, 58, 60, the digital samples that are output by the simulation system 10 have the appropriate time delay and frequency shift to simulate the desired targets.

The digital samples are received by the DAC 18 which converts the samples to the analog intermediate frequency signal. The up conversion circuit 20 receives the intermediate frequency signal and converts the frequency content thereof from its natural frequency value to a higher frequency value. The up conversion circuit 20 outputs the up-converted signal, which includes the appropriate amount of coarse delay, fine delay, and Doppler frequency shift to simulate the desired type of target. The radar system 12 receives the up-converted signal as the radar input signal and analyzes or processes it to determine what type of target was simulated. For example, the radar system 12 may determine that the target was stationary at a certain range (distance). Or the radar system 12 may determine that the target was moving with a certain velocity and/or at a certain heading. The radar system 12 may output commands, signals, and/or data, indicating any information regarding the target (determined by the design or application of the radar system 12), as feedback to the external configuration block 24. Depending on the goal of the test, if the determination of the target type was correct or incorrect, then no changes may occur and the test may conclude or the external configuration block 24 may output commands, control signals, and/or data to the control processor 38 to adjust the settings of one or more of the memory element 28, the fractional delay filter 32, and the single sideband modulator 36.

Figure 3:
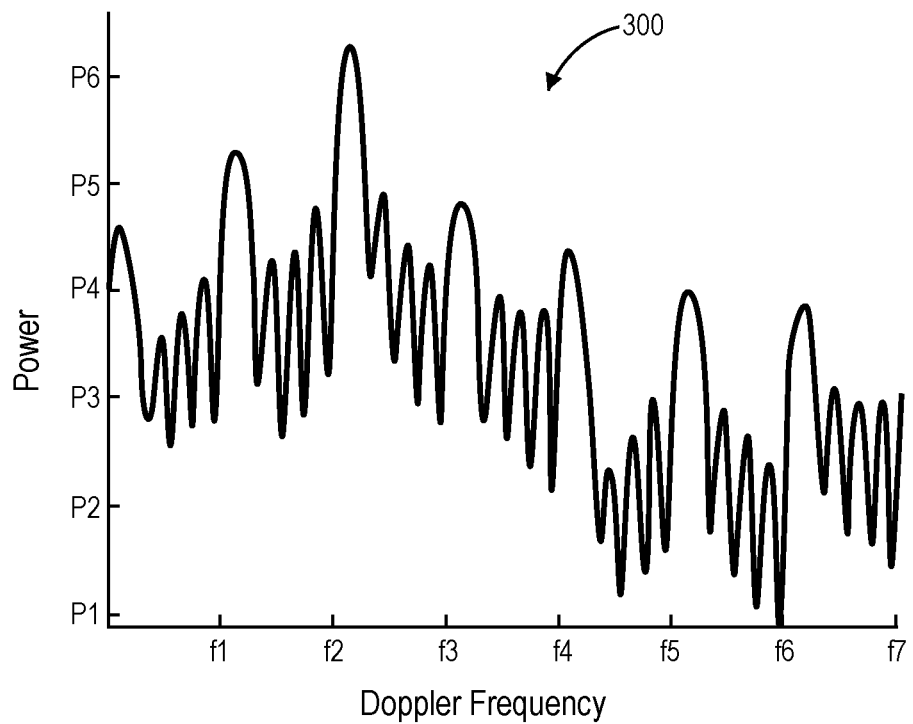
FIG. 3 is a plot of power versus frequency illustrating an output of a prior art simulation system, the plot showing the presence a number of objects when there should be only one object.

Referring to FIG. 3, a plot 300 of signal power vs. Doppler frequency of a signal output by a prior art simulation system. The output signal is similar to the up-converted signal discussed above which would be received by the radar system 12 and analyzed for the detection of targets. The plot 300 illustrates a Doppler spectrum of the output signal and includes a peak pulse around the f2 frequency that represents a single target. However, the plot 300 also includes numerous other lower power level pulses that may be confused for additional targets by the radar system 12. If it is known that there is supposed to be only one simulated target or the target should only have one Doppler frequency shift component and the radar system 12 detects multiple targets and/or multiple Doppler frequency shifts, then the test will fail. It may be falsely suspected that the radar system 12 is not functioning properly, when it is actually poor quality output from an inferior simulation system.

Figure 4:
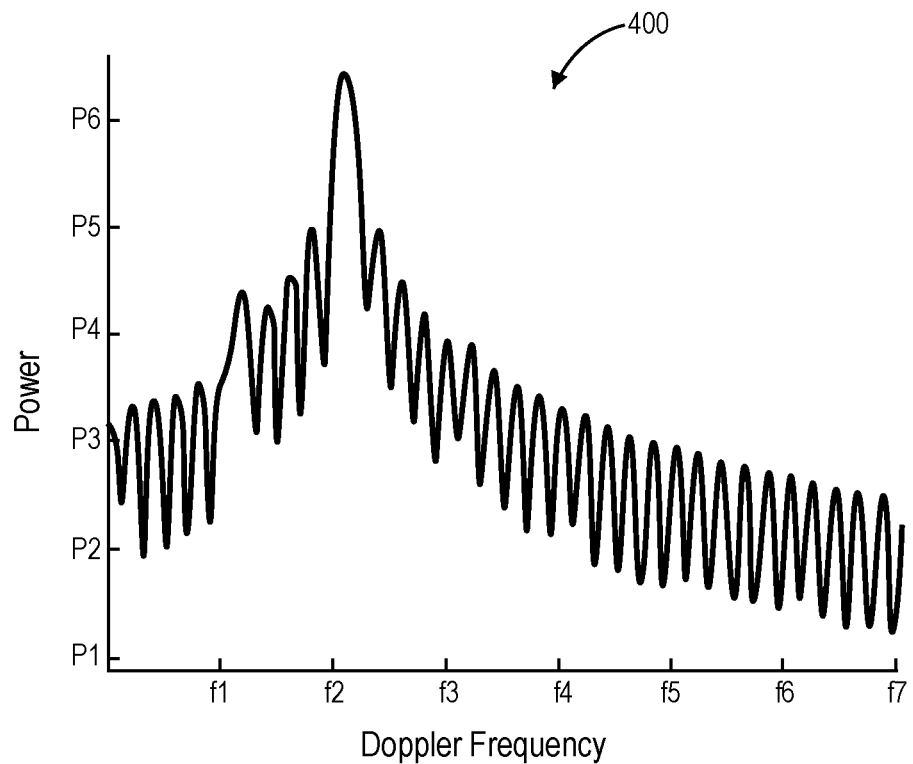
FIG. 4 is a plot of power versus frequency illustrating an output of the simulation system of the current invention, the plot correctly showing the presence of one object.

The simulation system 10 of the current invention corrects for the problems of the prior art simulation systems. By including at least the fractional delay filter 32 and fractional delay controller 34, the simulation system 10 outputs a signal that excludes all of the spurious pulses from the prior art system that may be incorrectly detected as targets. A plot 400 of signal power vs. Doppler frequency for the up-converted signal is shown in FIG. 4. The plot 400 includes the peak pulse at around the f2 frequency representing the target. But, the rest of the plot 400 shows the smooth decay of the signal away from the peak pulse, which results in the radar system 12 properly detecting a single target.

Figure 5:
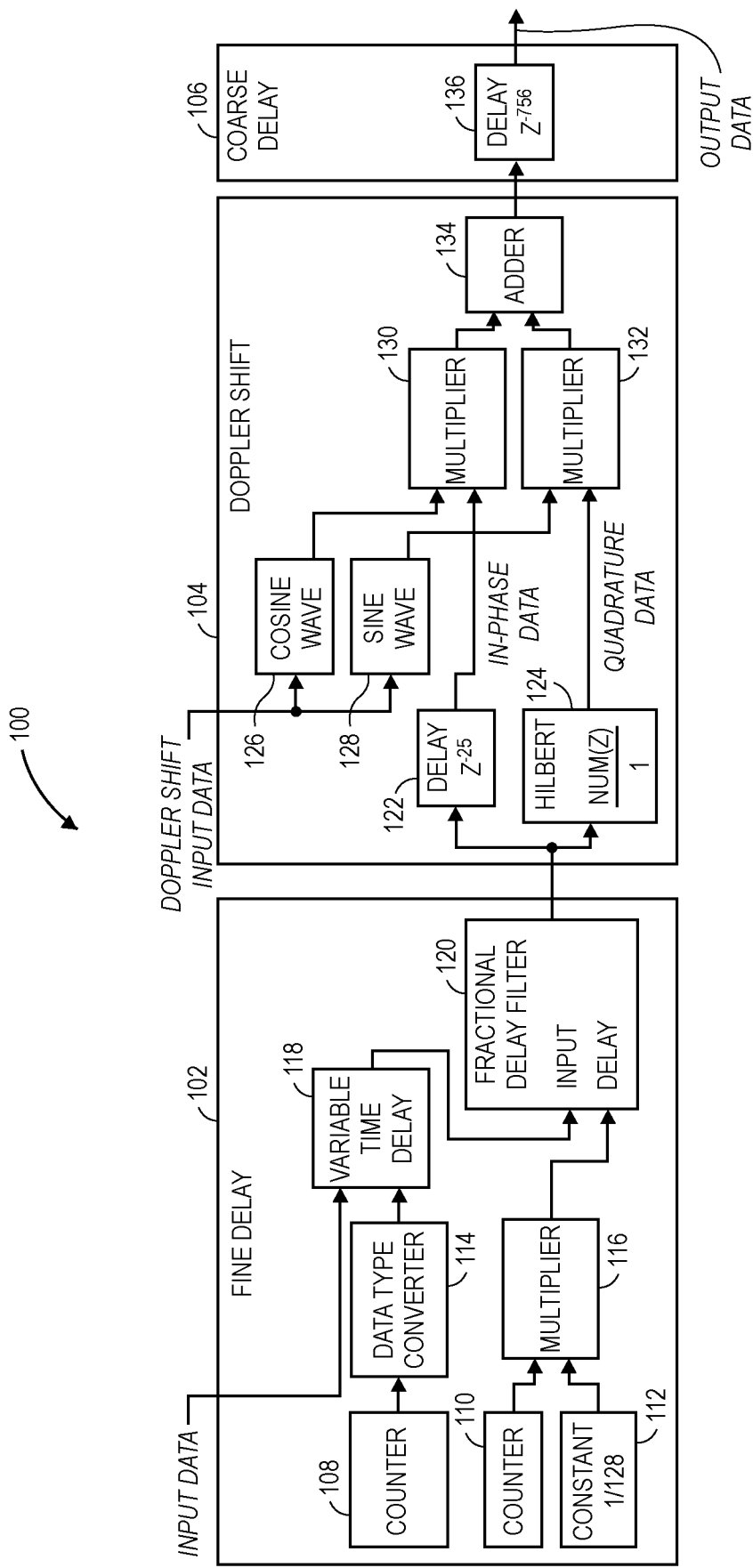
FIG. 5 is a schematic block diagram of a second embodiment of the simulation system.

A second embodiment of the simulation system 100 is shown in FIG. 5. The simulation system 100 may include the same modules, a fine delay module 102, a Doppler shift module 104, and a coarse delay module 106, as are present in the simulation system 10, but the modules may be formed from different components and may process data in a different order. The simulation system 100 could be inserted in the same location as the simulation system 10 in FIG. 1 to test the operation of the radar system 12. The functions of the simulation system 100 may be executed in hardware, software, firmware, or combinations thereof.

The fine delay module 102 generally provides higher resolution control of the delay of the (radar) data samples. That is, the fine delay module 102 may filter the data samples to represent a delay by relatively smaller delay times, or times that are less than the sample time period. The fine delay module 102 may include a first counter 108, a second counter 110, a constant value block 112, a data type converter 114, a first multiplier 116, a variable time delay unit 118, and a fractional delay filter 120.

Input data is received by the fine delay module 102. The input data may be digital samples received from the ADC 16, or the input data may be retrieved from a data file or generated by a data generator to represent data from the radar system 12. In any case, the input data is a stream of discrete data samples. The data samples are received by the variable time delay unit 118 which delays the data samples by a delay value that is set by the first counter 108, which may generate a series of numbers that increase in value, reset to a start value, and then repeat. The data type converter 114 receives the numbers from the first counter 108 and converts them to an appropriate format or type to be received by the variable time delay unit 118. The data samples from the variable time delay unit 118 are received by the fractional delay filter 120, which may be similar in structure and operation to the fractional delay filter 32, and may output fine delay data samples. The amount of simulated delay time filtering provided by the fractional delay filter 120 may be determined or set by the second counter 110 which produces a series of increasing numbers, similar to the first counter 108. The series of numbers are received by the first multiplier 116 which multiplies the numbers, each number in turn, by a selectable, fractional value, provided by the constant value block 112. The value provided by the constant value block 112 typically ranges from approximately 0 to approximately 1 and may be selected or set by an operator prior to, or during, a simulation of radar targets. The value shown in FIG. 5 is merely exemplary.

The doppler shift module 104 generally provides a programmable shift in frequency of the (radar) data samples. The doppler shift module 104 may include a first digital delay unit 122, a Hilbert transform unit 124, a cosine wave generator 126, a sine wave generator 128, a second multiplier 130, a third multiplier 132, and an adder 134.

The fine delay data samples from the fine delay module 102 are received by the first digital delay unit 122 and the Hilbert transform unit 124, which convert the samples into in-phase data and quadrature data, respectively. The amount of delay introduced by the first digital delay unit 122 should be roughly equivalent to the amount of delay introduced by the Hilbert transform unit 124. The delay value shown in FIG. 5 is merely exemplary. The cosine wave generator 126 and the sine wave generator 128 also receive doppler shift input data from a source such as the control processor 38, a data file, or a data generator. The cosine wave generator 126 may generate cosine wave data, and the sine wave generator 128 may generate sine wave data. The doppler shift input data may include frequency and amplitude setting values for the cosine and sine wave data. The cosine wave data and the in-phase data are received by the second multiplier 130, and the sine wave data and the quadrature data are received by the third multiplier 132. Each multiplier 130, 132 may multiply the data supplied by the inputs and/or perform a frequency mixing function on the input signal data and output product data that includes frequency components which are the sum and/or difference of the input signal data. That is, the second multiplier 130 may output product data that includes frequency components which are the sum and/or difference of the cosine wave data and the in-phase data, while the third multiplier 132 may output product data that includes frequency components which are the sum and/or difference of the sine wave data and the quadrature data. The adder 134 receives the product data from the second and third multipliers 130, 132, adds them together, and outputs doppler shift data samples, which are the sum of the two product data streams. The amount of frequency shift in the doppler shift data samples is selectable and may include no frequency shift of the frequency of the fine delay data samples, if that is desired.

The coarse delay module 106 generally provides lower resolution control of the delay of the (radar) data samples. That is, the coarse delay module 106 may delay the data samples by relatively larger delay times, or times that are greater than or equal to the sample time period. The coarse delay module 106 includes a second digital delay unit 136. The second digital delay unit 136 receives the doppler shift data samples, delays the samples by a plurality of sample time periods, and outputs coarse delay data samples. Typically, the number of sample time periods by which the doppler shift data samples are delayed is an integer value and is selectable. The delay value shown in FIG. 5 is merely exemplary. The coarse delay data samples are communicated to the DAC 18 or stored in a data file to be analyzed to verify the proper operation of the simulation system 100.

The discussion above regarding the fine delay module 102, the Doppler shift module 104, and the coarse delay module 106 describes the exemplary flow of the digital samples in the sequential order of the fine delay module 102, the Doppler shift module 104, and the coarse delay module 106, as shown in FIG. 5. It is within the scope of the current invention that the modules 102, 104, 106 may be connected in any sequential order. For example, the Doppler shift module 104 may receive the digital samples from the ADC 16. The fine delay module 102 may receive the digital samples from the Doppler shift module 104. And the coarse delay module 106 may receive the digital samples from the fine delay module 102. Other sequential orders are possible as well. No matter the order of the modules 102, 104, 106, the digital samples that are output by the simulation system 100 have the appropriate time delay and frequency shift to simulate the desired targets.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A simulation system for use in testing a radar system, the simulation system comprising:
 a coarse delay module configured to receive either a first stream of digital data samples that are sampled from a radar signal at a sample time period or a second stream of digital data samples that are processed by another simulation system component, delay the digital data samples by a selectable first delay time that is greater than or equal to the sample time period, and output coarse delayed samples;
 a fine delay module configured to receive either the first stream of digital data samples or the second stream of digital data samples, filter the digital data samples to represent delay by a selectable second delay time that is less than the sample time period, and output fine delayed samples, the fine delay module including
  a fractional delay filter including
   a standalone filter block configured to receive the digital data samples, filter the digital data samples, and output filtered data, and
   a plurality of computational stages configured to perform an interpolation calculation to determine values of the digital data samples at the second delay time, each computational stage including
    a first input configured to receive the digital data samples,
    a second input receiving an output of an adjacent computational stage,
    a filter block receiving the first input, filtering the first input, and outputting filtered data,
    a coefficient block receiving the second input, multiplying the second input by a coefficient, and outputting a product, and an adder adding the filtered data and the product and outputting a sum of the filtered data and the product, wherein the second input of the last computational stage receives the filtered data from the standalone filter block and the output of the first computational stage is the output of the fractional delay filter, and a fractional delay controller configured to control the operation of the fractional delay filter by setting parameters of the computational stages; and a doppler shift module configured to receive either the first stream of digital data samples or the second stream of digital data samples, adjust a value of one or more frequency components of the digital data samples, and output doppler shifted samples.

2. The simulation system of claim 1, wherein the coarse delay module includes a memory element configured to receive the digital data samples and store them, each digital data sample stored in a different one of a plurality of memory locations, the memory element further configured to transmit the digital data samples, and a memory controller configured to control the operation of the memory element so that the memory element stores each digital data sample for the first delay time.

3. The simulation system of claim 2, wherein the memory controller is further configured to determine memory locations where the digital data samples are written to and read from.

4. The simulation system of claim 1, wherein the standalone filter block and the filter block of each computational stage includes a finite impulse response filter.

5. The simulation system of claim 1, wherein the fractional delay controller determines a number of computational stages included in the fractional delay filter and a value of the coefficient of the coefficient block.

6. The simulation system of claim 1, wherein the fractional delay filter includes a Farrow structured fractional delay filter.

7. The simulation system of claim 1, wherein the doppler shift module includes a single sideband modulator configured to increase or decrease the value of one or more frequency components of the digital data samples.

8. The simulation system of claim 1, wherein the simulation system receives a feedback signal from the radar system and adjusts simulation parameters according to a content of the feedback signal.

9. A simulation system for use in testing a radar system, the simulation system comprising:

a coarse delay module configured to receive either a first stream of digital data samples that are sampled from a radar signal at a sample time period or a second stream of digital data samples that are processed by another simulation system component, delay the digital data samples by a selectable first delay time that is greater than or equal to the sample time period, and output coarse delayed samples, the coarse delay module including a memory element configured to receive the digital data samples and store them, each digital data sample stored in a different one of a plurality of memory locations, the memory element further configured to transmit the digital data samples, and a memory controller configured to control the operation of the memory element so that the memory element stores each digital data sample for the first delay time;

a fine delay module configured to receive either the first stream of digital data samples or the second stream of digital data samples, filter the digital data samples to represent delay by a selectable second delay time that is less than the sample time period, and output fine delayed samples, the fine delay module including a fractional delay filter including a standalone filter block configured to receive the digital data samples, filter the digital data samples, and output filtered data, and a plurality of computational stages configured to perform an interpolation calculation to determine values of the digital data samples at the second delay time, each computational stage including a first input configured to receive the digital data samples, a second input receiving an output of an adjacent computational stage, a filter block receiving the first input, filtering the first input, and outputting filtered data, a coefficient block receiving the second input, multiplying the second input by a coefficient, and outputting a product, and an adder adding the filtered data and the product and outputting a sum of the filtered data and the product, wherein the second input of the last computational stage receives the filtered data from the standalone filter block and the output of the first computational stage is the output of the fractional delay filter, and a fractional delay controller configured to control the operation of the fractional delay filter by setting parameters of the computational stages; and a doppler shift module configured to receive either the first stream of digital data samples or the second stream of digital data samples, adjust a value of one or more frequency components of the digital data samples, and output doppler shifted samples.

10. The simulation system of claim 9, wherein the fractional delay controller determines a number of computational stages included in the fractional delay filter and a value of the coefficient of the coefficient block.

11. The simulation system of claim 9, wherein the simulation system receives a feedback signal from the radar system and adjusts simulation parameters according to a content of the feedback signal.

12. The simulation system of claim 9, wherein the fractional delay filter includes a Farrow structured fractional delay filter.

13. The simulation system of claim 9, wherein the doppler shift module includes a single sideband modulator configured to increase or decrease the value of one or more frequency components of the digital data samples.

14. A simulation system for use in testing a radar system, the simulation system comprising:

a fine delay module configured to receive either a first stream of digital data samples that are sampled from a radar signal at a sample time period or a second stream of digital data samples that are processed by another simulation system component, the fine delay module including a first counter configured to generate a sequentially increasing first series of numbers that are communicated to the variable time delay unit to set a delay time, a second counter configured to generate a sequentially increasing second series of numbers, a constant value block configured to generate a numerical value, a multiplier configured to receive the second series of numbers and the numerical value, multiply each number by the numerical value in turn, and output a product that is communicated to the fractional delay filter to set a simulated delay time, a variable time delay unit configured to receive the digital data samples, delay them by a variable time period, and output variable time delayed samples, and a fractional delay filter configured to receive the variable time delayed samples, filter the variable time delayed samples to represent delay by a selectable first delay time that is less than the sample time period, and output fine delayed samples;

a doppler shift module configured to receive either the first stream of digital data samples or the second stream of digital data samples, adjust a value of one or more frequency components of the digital data samples, and output doppler shifted samples; and a coarse delay module configured to receive either the first stream of digital data samples or the second stream of digital data samples, delay the digital data samples by a selectable second delay time that is greater than or equal to the sample time period, and output coarse delayed samples.

15. The simulation system of claim 14, wherein the doppler shift module further includes a hilbert transform unit configured to receive the digital data samples and output quadrature data, a digital delay unit configured to receive the digital data samples and output in-phase data with a delay to maintain synchronization of the in-phase and quadrature data streams, a cosine wave generator configured to receive setting data and output cosine wave data, a sine wave generator configured to receive setting data and output sine wave data, a first multiplier configured to receive the cosine wave data and the in-phase data, multiply the cosine wave data and the in-phase data, and output a first product, a second multiplier configured to receive the sine wave data and the quadrature data, multiply the sine wave data and the quadrature data, and output a second product, an adder configured to receive the first product and the second product, add the first product and the second product, and output a sum that is the doppler shifted samples.

16. The simulation system of claim 14, wherein the coarse delay module further includes a digital delay unit configured to receive the digital data samples, delay them for a plurality of sample time periods, and output the coarse delayed samples.

17. A simulation system for use in testing a radar system, the simulation system comprising:

a fine delay module configured to receive either a first stream of digital data samples that are sampled from a radar signal at a sample time period or a second stream of digital data samples that are processed by another simulation system component, the fine delay module including a variable time delay unit configured to receive the digital data samples, delay them by a variable time period, and output variable time delayed samples, and a fractional delay filter configured to receive the variable time delayed samples, filter the variable time delayed samples to represent delay by a selectable first delay time that is less than the sample time period, and output fine delayed samples;

a doppler shift module configured to receive either the first stream of digital data samples or the second stream of digital data samples, adjust a value of one or more frequency components of the digital data samples, and output doppler shifted samples, the doppler shift module including a hilbert transform unit configured to receive the digital data samples and output quadrature data, a digital delay unit configured to receive the digital data samples and output in-phase data with a delay to maintain synchronization of the in-phase and quadrature data streams, a cosine wave generator configured to receive setting data and output cosine wave data, a sine wave generator configured to receive setting data and output sine wave data, a first multiplier configured to receive the cosine wave data and the in-phase data, multiply the cosine wave data and the in-phase data, and output a first product, a second multiplier configured to receive the sine wave data and the quadrature data, multiply the sine wave data and the quadrature data, and output a second product, an adder configured to receive the first product and the second product, add the first product and the second product, and output a sum that is the doppler shifted samples; and a coarse delay module configured to receive either the first stream of digital data samples or the second stream of digital data samples, delay the digital data samples by a selectable second delay time that is greater than or equal to the sample time period, and output coarse delayed samples.

* * * * *